(12) United States Patent
Loureiro et al.

(10) Patent No.: US 8,819,767 B2
(45) Date of Patent: Aug. 26, 2014

(54) METHOD FOR SECURING DATA AND/OR APPLICATIONS IN A CLOUD COMPUTING ARCHITECTURE

(76) Inventors: Sergio Loureiro, Antibes (FR); Matthias Jung, Mougins (FR)

( * ) Notice: Subject to any disclaimer, the term of this patent is extended or adjusted under 35 U.S.C. 154(b) by 108 days.

(21) Appl. No.: 13/079,506

(22) Filed: Apr. 4, 2011

(65) Prior Publication Data
US 2011/0247047 A1  Oct. 6, 2011

(30) Foreign Application Priority Data

Apr. 2, 2010  (FR) ...................................... 10/01382

(51) Int. Cl.
*G06F 17/00* (2006.01)
*H04L 29/06* (2006.01)

(52) U.S. Cl.
CPC ............... *H04L 63/10* (2013.01); *H04L 63/20* (2013.01)
USPC ........................................................... 726/1

(58) Field of Classification Search
USPC .................... 726/1–10, 26–30; 713/150–155, 713/164–167
See application file for complete search history.

(56) References Cited

U.S. PATENT DOCUMENTS

| | | | |
|---|---|---|---|
| 6,708,276 B1 * | 3/2004 | Yarsa et al. | 726/6 |
| 8,528,107 B1 * | 9/2013 | Ginzton et al. | 726/29 |
| 2002/0091942 A1 * | 7/2002 | Cooper et al. | 713/201 |
| 2004/0268148 A1 * | 12/2004 | Karjala et al. | 713/201 |
| 2005/0015471 A1 * | 1/2005 | Zhang et al. | 709/221 |
| 2006/0143699 A1 * | 6/2006 | Nagata et al. | 726/11 |
| 2007/0157287 A1 * | 7/2007 | Lim | 726/1 |
| 2008/0083036 A1 | 4/2008 | Ozzie et al. | |
| 2009/0019515 A1 * | 1/2009 | Excoffier et al. | 726/1 |
| 2009/0133097 A1 * | 5/2009 | Smith et al. | 726/1 |
| 2009/0199285 A1 * | 8/2009 | Agarwal et al. | 726/9 |
| 2009/0228967 A1 | 9/2009 | Gbadegesin et al. | |
| 2009/0249440 A1 * | 10/2009 | Platt et al. | 726/1 |
| 2010/0169948 A1 * | 7/2010 | Budko et al. | 726/1 |
| 2010/0217850 A1 * | 8/2010 | Ferris | 709/223 |
| 2010/0235630 A1 * | 9/2010 | Carter et al. | 713/162 |

(Continued)

OTHER PUBLICATIONS

Meiko Jensen et al., "On Technical Security Issues in Cloud Computing"; 2009 IEEE International Conference on Cloud Computing; pp. 109-116 (Cited in Search Report of priority French Appl. No. FR1001382).

(Continued)

*Primary Examiner* — Darren B Schwartz
(74) *Attorney, Agent, or Firm* — Westerman, Hattori, Daniels & Adrian, LLP

(57) ABSTRACT

A method for securing data and/or applications within a cloud computing architecture is provided. According to the invention, a security module is provided, the security module being administered by the user of said virtual server(s) which is/are dedicated to said user; said security module is provided with one or more security policies to be applied to the data managed by the virtual servers dedicated to said user; said security module is provided with identifiers as well as keys to access the user's dedicated virtual servers; the security module accesses the user's dedicated virtual server; the security module exports the security policies, which have been provided to it, to the dedicated virtual servers; and the dedicated virtual servers apply the security policies, which have been provided to them by the security module, to the data they manage.

20 Claims, 4 Drawing Sheets

(56) References Cited

U.S. PATENT DOCUMENTS

| | | | |
|---|---|---|---|
| 2011/0072486 A1* | 3/2011 | Hadar et al. | 726/1 |
| 2011/0093941 A1* | 4/2011 | Liu et al. | 726/7 |
| 2011/0126272 A1* | 5/2011 | Betzler et al. | 726/6 |
| 2011/0138442 A1* | 6/2011 | Vinberg et al. | 726/1 |
| 2011/0154443 A1* | 6/2011 | Thakur et al. | 726/3 |
| 2011/0167472 A1* | 7/2011 | Evans et al. | 726/1 |

OTHER PUBLICATIONS

Wassim Itani et al., "Privacy as a Service: Privacy—Aware Data Storage and Processing in Cloud Computing Architectures"; 2009 Eighth IEEE International Conference on Dependable, Autonomic and Secure Computing; pp. 711- 716 (Cited in Search Report of priority French Appl. No. FR1001382).

Search Report of priority French Application No. 1001382.

\* cited by examiner

METHOD FOR SECURING DATA AND/OR APPLICATIONS IN A CLOUD COMPUTING ARCHITECTURE

BACKGROUND OF THE INVENTION

This invention relates to a method for securing data and/or applications in a "cloud" computing architecture. More specifically, it relates to a method in which the architecture comprises:—a set of virtual servers identified by server identifiers, each virtual server being associated with one or more virtual memory disks, each virtual memory disk being materialized in the form of one or several memory spaces in one or more physical memory disks,—an administration interface which allows a remote user to access, via an Internet-type network, one or more virtual servers which is/are dedicated to said user in the set of virtual servers by means of a key which is specific to the user and/or each virtual server, and for administering said dedicated virtual servers and/or interface components for creating and managing the set of virtual servers.

Infrastructures-as-a-Services (IaaS) are computer infrastructures that have recently been introduced in cloud computing architectures. Such IaaS infrastructures are, for example, provided by Amazon™, Rackspace™, Sun Microsystems™, IBM™, Microsoft™ as well as by certain providers. Today, Amazon™ is the leading provider of such infrastructures. The Infrastructure-as-a-Service provided by Amazon™ is known as EC2™.

Securing the data managed within a dynamic cloud computing architecture is a complex task. Indeed, this data is managed by virtual servers and is stored on disks, which are virtual themselves, and not by physical servers and physical disks distinct from each other.

Attacks or tampering intended to obtain a user's data in a cloud architecture are generally side-channel attacks that may not only originate from the outside, that is, from third parties not using the architecture, but also from other users of the architecture or even service providers. For example, such side-channel attacks may use the shared infrastructure's administration data in order to derive information relating to applications or users.

As a result, service users have only a limited degree of confidence in the ability of cloud computing architectures to preserve their data's integrity and confidentiality.

Of course, methods for securing data through encryption have been imagined. However, these methods are complex to implement and cumbersome to administer, particularly when a large number of virtual servers managing multiple and diversified data are available to the users. Also, these methods are conventional and are designed to be deployed within specific activity frameworks which undergo little or only very gradual change. They are not applicable to the dynamic architectures of cloud computing.

SUMMARY OF THE INVENTION

According to the above, a problem which the invention aims to solve is that of securing a user's data in a dynamic cloud computing architecture in a simple way and without the need for cumbersome administration.

The solution proposed by the present invention to solve this problem consists in providing a method for securing data and/or applications within a cloud computing architecture, which comprises:

a set of virtual servers identified by server identifiers, each virtual server being associated with one or more virtual memory disks, each virtual memory disk being materialized in the form of one or more memory spaces in one or more physical memory disks, an interface for allowing a remote user to access, via an Internet-type network, one or more virtual servers which are dedicated to said user in the set of virtual servers by means of the identifier and a key which is specific to the user and/or each virtual server, and to administer said dedicated virtual servers, interface components for creating and managing the set of virtual servers, characterized in that it comprises the following steps:

a security module is provided, said security module being administered by the user of the virtual server(s) which is/are dedicated to said user;

said security module is provided with one or more security policies to be applied to the data managed by the virtual servers dedicated to said user;

said security module is provided with the key which is specific to the user and/or each dedicated server, for accessing the user's dedicated virtual servers;

the security module accesses said dedicated virtual servers of the user; and the dedicated virtual servers apply the security policies, which have been provided to said security module, to the data and/or applications they manage.

Advantageously, the method further comprises the following steps: an agent is installed on a dedicated virtual server; and the security module exports the security policies, which have been provided to it, to the dedicated server on which the agent is installed;—the security policies provided to the security module are applied through a secure channel to the dedicated virtual servers by remote execution, from said security module; the method further comprises the following steps: new dedicated virtual servers are created dynamically within the cloud computing architecture; the key which is specific to the user and/or each newly created dedicated virtual server is provided to the security module; and the new dedicated virtual servers apply the security policies, which have been provided to them by the security module, to the data and/or applications they manage;—the security policies applied to the data and/or applications of the new virtual servers are applied automatically;—the security module is itself a dedicated virtual server contained within the cloud computing architecture;—the security module is provided by a software provider as a service within the cloud computing architecture;—the security module is a software module installed on a user's physical computer station;—the architecture further comprises an event-recording module and the security module accesses events recorded by said event-recording module for the dedicated virtual servers and checks whether the security policies have been applied by said dedicated virtual servers based on said events;—the key specific to the user and/or each dedicated virtual server is stored in the security module, in a trusted platform's module, in a smart card or with a trusted third party;—the method is performed within a computing architecture which comprises a plurality of clouds; and—the data is encrypted in the dedicated virtual servers in compliance with the application of a security policy applied to said servers;—the data is encrypted according to the security policies applied within the dedicated virtual servers so that, after the dedicated virtual servers have been deleted, said data is no longer readable, and/or so as to thwart side-channel attacks.

BRIEF DESCRIPTION OF THE DRAWINGS

The invention will be better understood from the following non-limiting description given with reference to the accompanying drawings, in which.

DETAILED DESCRIPTION OF PARTICULAR EMBODIMENTS

The computing architectures according to the invention are dynamic cloud architectures.

Figure 1A:
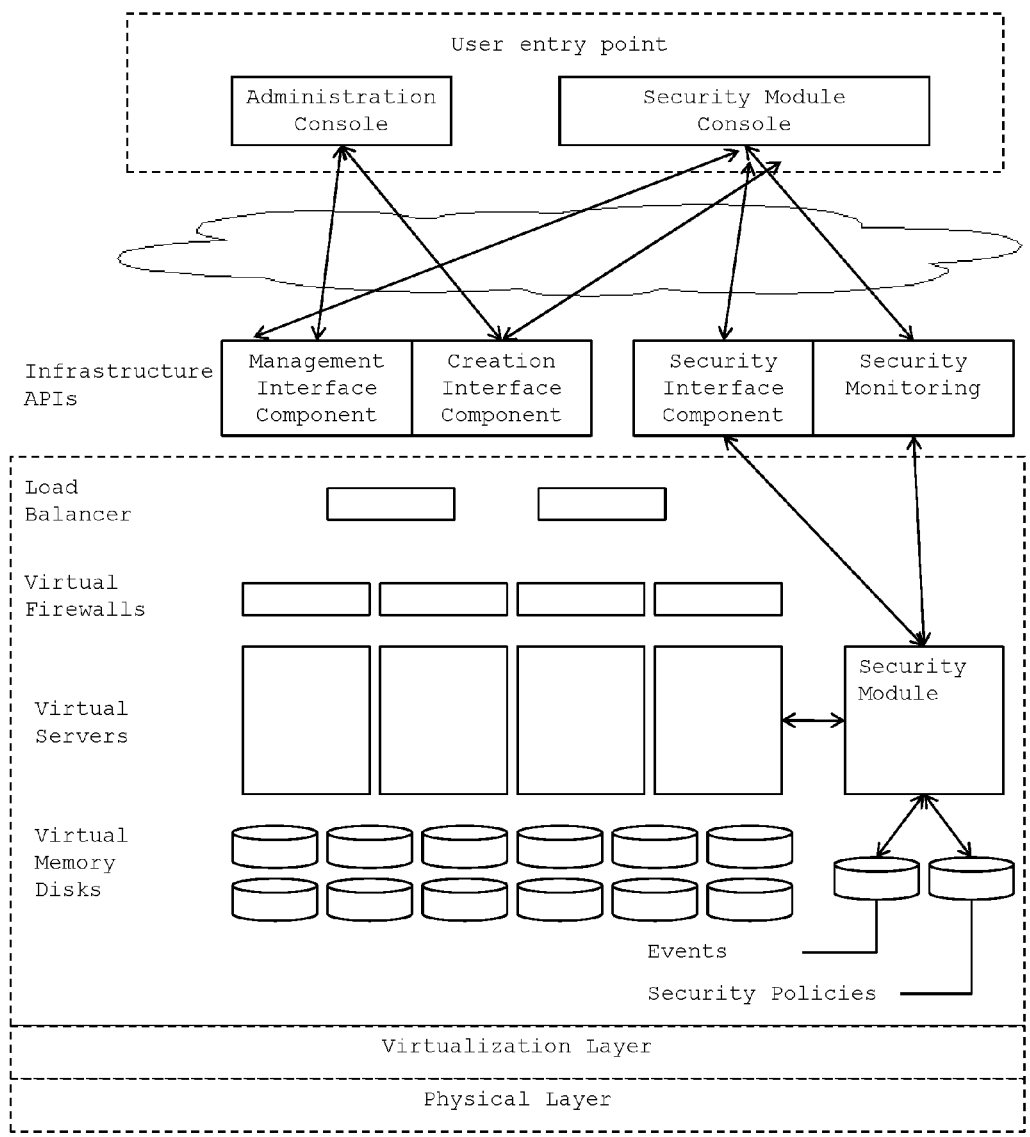
FIGS. 1A, 1B, and 1C schematically show different dynamic cloud computing architectures for the implementation of the method according to the invention.

As shown in FIG. 1A, such architectures comprise a set of virtual servers, wherein said virtual servers may, if appropriate, comprise particular agents whether or not installed. Each virtual server is identified, within the architecture, by at least one server identifier. Furthermore, each virtual server is associated with one or more virtual memory disks. Each virtual memory disk is materialized in the form of one or more physical memory disks. These physical disks are not shown in FIG. 1A. However, they are part of the architecture's physical layer, contrary to virtual instances, which are part of the virtualization layer.

Additionally, the architectures according to the invention comprise an interface, for example an administration console. Thanks to this administration console, a user may, at a user entry point, access, via an Internet-type network, one or several virtual servers which are dedicated to said user among the virtual servers. Such access is performed by means of the dedicated virtual server's identifier, and a key which is specific to it. This specific key is a key enabling access to the infrastructure's administration. Furthermore, using the administration console, the user may administer his dedicated virtual servers.

An infrastructure of application programming interfaces (APIs) allows virtual servers, in particular, to be created and managed within the architecture. Thus, these APIs will include a management interface component and a creation interface component.

The architecture comprises components for balancing loads across the architecture as well as virtual firewalls.

According to the invention, the architecture further comprises a security module. This security module is administered by the user of the virtual server(s) which is/are dedicated to said user, for example by means of a console in the security module which is made available at the user's entry point. The API infrastructure is then complemented by a security interface component and a security monitoring component.

The security module accesses one or more security policies, which may be applied to data and/or applications managed by the virtual servers dedicated to said user. These security policies are sets of rules which, for the data and/or applications managed by the dedicated virtual servers, define confidentiality, integrity and, advantageously, availability.

The security policy may be defined in the XCCDF XML language (eXtensible Configuration Checklist Description Format), which is part of the NIST's (National Institute of Standards and Technology) SCAP (Security Content Automation Protocol) specifications. This language makes it possible to represent a structured set of security rules in such a way as to support security information exchange, and therefore, to generalize good practice in terms of security.

In one example, confidentiality may be preserved in compliance with a security policy, that is, a rule, by means of systematic data encryption. In this simple example, the rule is to "systematically encrypt data". It is not the encryption key. In another example, integrity may be preserved in compliance with a security policy by monitoring an application's configuration files. In that case, the rule is to "monitor an application's configuration files". In still another example, availability may be managed in compliance with a security policy through the implementation of a redundant architecture. The rule is then to "implement a redundant architecture". Generally speaking, a security policy comprises a plurality of rules: "systematically encrypt data AND monitor an application's configuration files AND implement a redundant architecture". The security policies according to the invention generally apply not only to data, but also to applications.

Moreover, the architecture further comprises an event-recording module. The security module accesses the events recorded by said event-recording module for the dedicated virtual servers and checks whether the security policies have been applied by said dedicated virtual servers based on said events.

In the case shown in FIG. 1A, the security module is installed on a dedicated virtual server of the user who wishes to implement the method according to the invention. Thus, it is a dedicated virtual server contained in the cloud computing architecture.

Figure 1B:
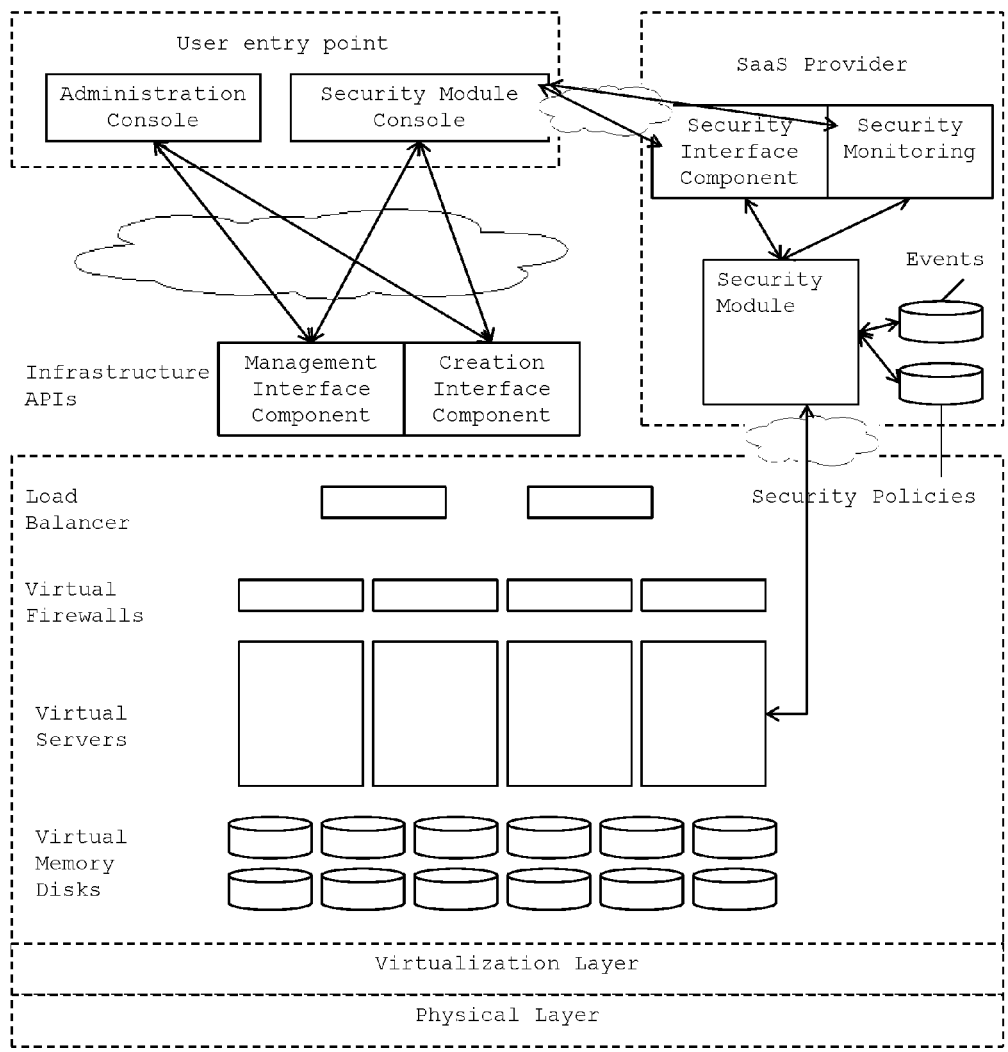
Figure 1C:
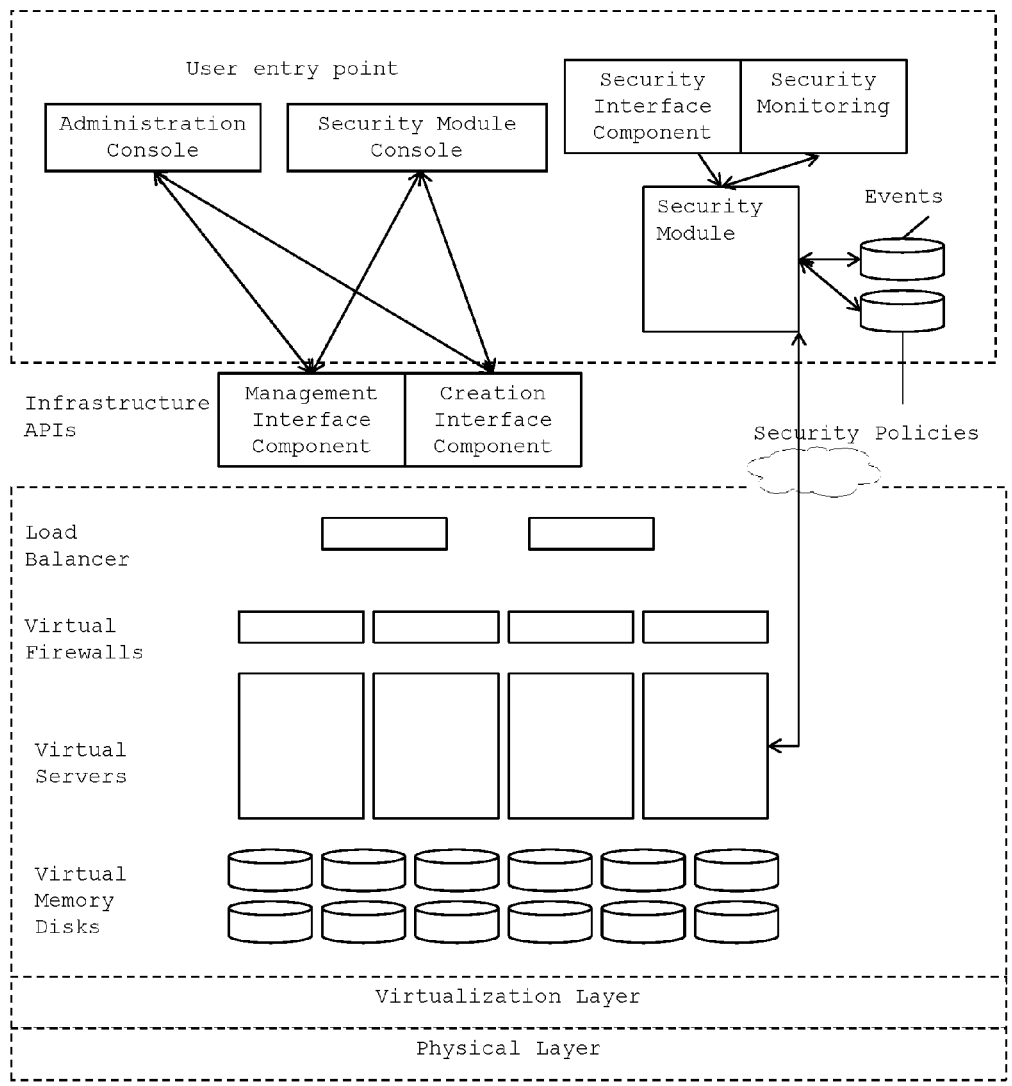

However, other embodiments may be implemented. For example, and as shown in FIG. 1B, the security module is a module which is directly managed by the SaaS provider. Thus, it is provided by a software provider as a service within the cloud computing architecture. In another example, which is shown in FIG. 1C, the security module is installed on the user's physical computer station, which constitutes the entry point to the cloud architecture.

The method according to the invention is characterized in that it comprises the following steps.

Firstly, a security module is provided, which is administered by the user of the virtual server(s) which is(are) dedicated to said user, by means of the security module console. The security module may be installed by means of a secure channel, for instance using the SSL or SSH protocols. The security console comprises a graphical user interface (GUI), which allows the user to define security policies which relate, for example, to the confidentiality and integrity of data and/or applications stored within the architecture, to the monitoring of security-related events, and to the implementation of virtual private networks.

Thereafter, said security module is provided with one or more security policies to be applied to the data and/or applications managed by the virtual servers that are dedicated to said user. In one example, these are security policies which are defined by the user using the security console.

In the Amazon™ EC2™ architecture example, the existing network restrictions, which apply to virtual servers, for example security groups, are extended to a security policy which will be applied to data and/or applications managed by the dedicated virtual servers.

Thereafter, said security module is provided with the identifiers as well as the access keys of the virtual servers dedicated to the user.

The security module then accesses said virtual servers dedicated to the user by means of the access key(s) which has/have been provided to the security module.

It exports the security policies which have been provided to it to said dedicated virtual servers.

Then, the dedicated virtual servers apply the security policies, which have been provided to them by the security module, to the data and/or applications they manage.

In practice, the data transiting and stored in the architecture is thus made secure without modifications being performed at the application level within the architecture.

It should be noted that the security policies may be installed on the dedicated virtual-servers by means of two mechanisms. The first of these involves a mechanism in which a remote command is executed by means of a secure channel, typically of the SSH type. The second is a mechanism in which agents are systematically installed on all or part of the servers. According to the latter mechanism, the console communicates with the agents through a secure channel. It should further be noted that both mechanisms may be employed concurrently.

If the user dynamically creates new dedicated virtual servers within the cloud computing architecture using the administration console, the identifiers and keys of said newly created dedicated virtual servers will be provided to the security module. In that case, the security module automatically exports the security policies previously provided for other dedicated virtual servers to the new dedicated virtual servers, and the new dedicated virtual servers apply the security policies, which have been provided to them by the security module, to the data and/or applications they manage. In practice, the security policies applied to the data and/or applications of the new virtual servers are automatically applied. Thus, the user is not involved. It should be noted that in the case where enforcement of the required security is not possible for a particular dedicated virtual server, according to the invention, a maximum-security policy is then applied.

The same is true if the dedicated virtual servers are dynamically created automatically, without the user being involved, as a consequence of the load on the dedicated virtual servers already administered by the user.

The method according to the invention may be implemented without its operation being monitored. However, advantageously, by analyzing secure virtual service-related events, the application of the security policy to data and/or applications will be monitored. In the case where a maximum-security policy has been applied by default, the monitoring processes, which, if needed, may be coupled with training stages in which iterations between the resources within a controlled environment are detected, may change the security policies when exceptions occur.

Therefore, there are preferably two competing monitoring processes. The first of these is a first process for monitoring the changes in the infrastructure by means of the provider's management APIs, for example when starting a new server or storage unit. In this first process, the security module alone discovers changes occurring in the infrastructure. Next, a second process checks whether the security policy is actually enforced. This second process makes it possible to check, for example, whether the storage is effectively encrypted in accordance with the security policy. If one of the processes generates exceptions, these are then recorded, and a task is added in order to resolve this exception.

These monitoring processes may or may not be jointly managed.

Figure 2A:
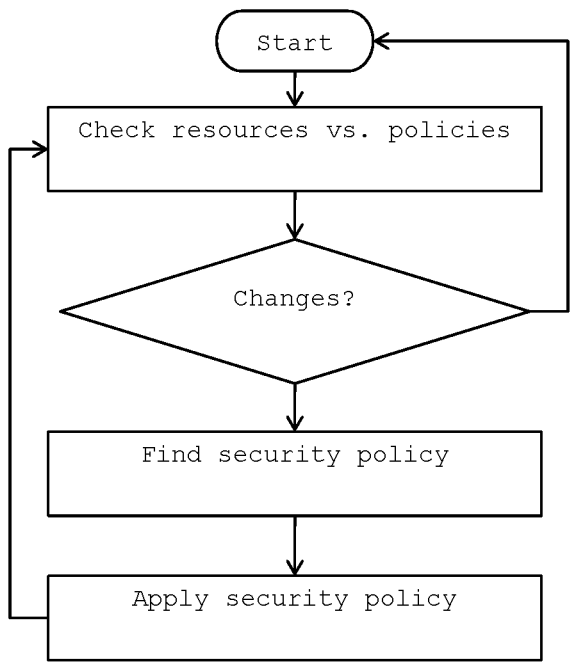
FIGS. 2A and 2B are flowcharts showing specific embodiments of the method according to the invention.

As shown in FIG. 2A, to monitor the changes occurring in the infrastructure, for each of the virtual servers, the applied policies are checked. If changes have been made, for example if a dedicated virtual server has been dynamically created, then the security module finds a security policy applicable to the data and/or applications managed by the new virtual server. This policy is then applied to said server. On the other hand, if no change has been made, then for each of the virtual servers, the applied policies are checked.

In a cloud computing architecture, the number of dedicated virtual servers may decrease over time, for example if the user wishes to delete a server. A decrease in the number of dedicated virtual servers may have implications on the applied security policies, such as for example a reduction in fault tolerance. The consequence of a decrease in the number of dedicated virtual servers may thus be an infringement to a security policy. In the method according to the present invention, such a decrease in the number of dedicated virtual servers would be detected, advantageously in an automatic fashion, and would be taken into account. The affected security policies are then likely to be modified. However, in such a case, prior to any change, alarms may be triggered. These may for example involve the sending of an email or a short text message. It is also possible to specify that the security policy takes priority.

Furthermore, it should be noted that a particular problem occurring in a cloud computing architecture is data remanence. In this regard, when a dedicated virtual server or disk is deleted, data may be left on the disks. By encrypting the data according to the security policies applied in the dedicated servers, the data left on the deleted virtual disks will remain unreadable. Protection of said data is thus ensured. Systematic encryption also protects against open-channel attacks between co-residents of the same physical platforms. Even if a co-resident manages to pass beyond the insulation between the virtual machines, it will additionally have to discover the keys.

Figure 2B:
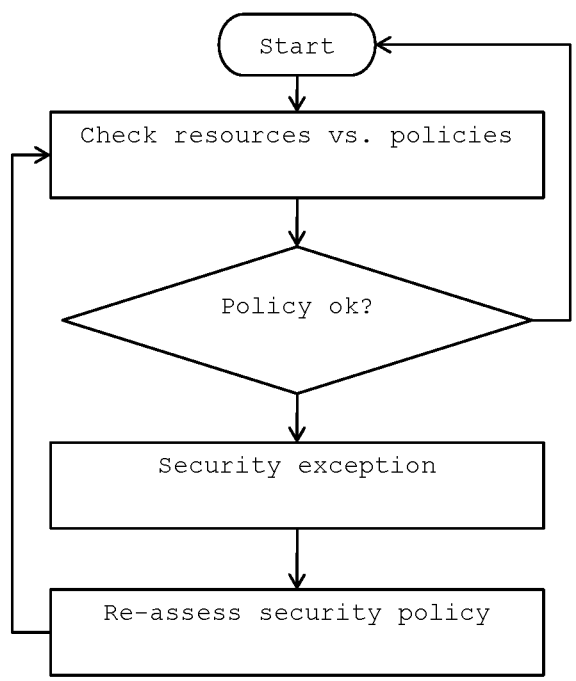

As shown in FIG. 2B, to check whether the security policies are enforced within the dedicated virtual infrastructure, for each of the virtual servers, the applied policies are checked. A decision is then made: does the security policy match expectations? If not so, security exceptions are looked up and the security policy is reassessed. If so, a new check is performed.

It should be noted that according to alternative embodiments of the present invention, it is possible to ensure version management and provide a feature for downgrading to a previous infrastructure, detection of incidents such as information leakage, resource optimization, cost control and prediction of required capacities.

It should be noted that the key, which is specific to the user and/or each dedicated server, may be stored in agents, within the security module, which in this case may or may not comprise a Trusted Platform Module (TPM), or a smartcard which may or may not comprise a TPM provided at the user station. Lastly, the keys may be stored by a trusted third party.

The invention claimed is:

1. A method for securing data and/or applications within a cloud computing architecture, wherein the cloud computing architecture comprises:
    a set of virtual servers identified by first server identifiers, each virtual server being associated with one or more virtual memory disks, each virtual memory disk being materialized in the form of one or more memory spaces in one or more physical memory disks,
    an interface for allowing a remote user to access, via an Internet-type network, one or more virtual server(s) which are dedicated to said user in the set of virtual servers by means of a first access key which is specific to the user and/or to each of the one or more virtual server(s) dedicated to the user, and to administer said one or more dedicated virtual server(s), and
    interface components for creating and managing the set of virtual servers,
    wherein the method comprises the following steps:
    providing a security module, said security module being administered by the user through a security module console;
    providing said security module with security policies to be applied to data and/or applications in the one or more dedicated virtual server(s), said security policies being sets of rules which define confidentiality, integrity and/or availability of said data and/or applications;

providing said security module with said first access key, for accessing the user's one or more dedicated virtual server(s);

defining security policies to be applied to the data and/or applications in the one or more dedicated virtual server(s) through the security console, said defined security policies being selected among the sets of rules which define confidentiality, integrity and/or availability of said data and/or applications, said defining being performed by the user;

accessing said one or more dedicated virtual server(s) of the user by means of said first access key, said accessing being performed by the security module;

applying the defined security policies to the data and/or applications in the one or more dedicated virtual server(s), said applying being performed by the one or more dedicated virtual server(s);

installing the security policies on the dedicated virtual server(s) by means of a secure channel;

securing the applications and/or the data in the one or more dedicated virtual server(s) according to the defined security policies; and further dynamically creating one or more new virtual server(s) dedicated to said user within the cloud computing architecture;

providing second identifiers and second key(s), which are specific to the one or more new dedicated virtual server(s), to the security module;

accessing said one or more new dedicated virtual server(s) of the user by means of said second identifiers and/or second key(s), said accessing being performed by the security module;

installing the security policies on the one or more new dedicated virtual server(s) by means of the secure channel;

applying the defined security policies, which have been provided to the one or more new dedicated virtual server(s) by the security module, to data and/or applications in the one or more new dedicated virtual server(s), said applying being performed by the one or more new dedicated virtual server(s), and securing the applications and/or the data in the one or more new dedicated virtual server(s) according to the defined security policies.

2. The method according to claim 1, further comprising the following steps:
an agent is installed on each of the dedicated virtual servers; and
the security module exports the security policies which have been provided to it to the dedicated servers on which the agent is installed.

3. The method according to claim 1, wherein the security policies provided to the security module are applied through a secure channel to the dedicated virtual servers by remote execution, from said security module.

4. The method according to claim 1, wherein existing network restrictions, which are applied to the virtual servers, are extended to a security policy which will be applied to the data and/or applications managed by the dedicated virtual servers.

5. The method according to claim 1, wherein the security policies applied to the data and/or applications of the new one or more dedicated virtual server(s) are applied automatically.

6. The method according to claim 1, wherein the security module is itself a dedicated virtual server contained within the cloud computing architecture.

7. The method according to claim 1, wherein the security module is provided by a software provider as a service within the cloud computing architecture.

8. The method according to claim 1, wherein the security module is a software module installed on a user's physical computer station.

9. The method according to claim 1, wherein the architecture further comprises an event-recording module and in that the security module accesses events recorded by said event-recording module for the dedicated virtual servers and checks whether the security policies have been applied by said dedicated virtual servers based on said events.

10. The method according to claim 1, wherein the key specific to the user and/or each one or more dedicated virtual server is stored in the security module, in a trusted platform's module, in a smart card, or with a trusted third party.

11. The method according to claim 1, wherein the method is implemented within a computing architecture which comprises a plurality of clouds.

12. The method according to claim 1, wherein the data is encrypted in the dedicated virtual servers in compliance with the application of a security policy applied to said servers.

13. The method according to claim 1, wherein the data is encrypted according to the security policies applied within the dedicated virtual servers so that, after the dedicated virtual servers have been deleted, said data is no longer readable, and/or so as to thwart side-channel attacks.

14. The method according to claim 1, wherein there are a plurality of dedicated virtual servers.

15. The method according to claim 1, wherein the security policies are applied to the data.

16. The method according to claim 15, wherein a security policy includes sets of rules which define confidentiality of the data.

17. The method according to claim 16, wherein the securing of the applications and/or the data in the one or more dedicated virtual server(s) includes encrypting the data in accordance with the defined security policy.

18. The method according to claim 1, further comprising
installing the security policies defined by the user to the one or more dedicated virtual server(s), said installing being performed by the security module;
wherein the security module installs the security policies defined by the user for the one or more dedicated virtual server(s), to the one or more new dedicated virtual server(s).

19. The method according to claim 1, wherein said defined security policies are sets of rules which define confidentiality, integrity and availability of said data and/or applications in the one or more dedicated virtual server(s).

20. The method according to claim 19, wherein said defined security policies are sets of rules which define confidentiality, integrity and availability of said data and applications in the one or more dedicated virtual server(s).

* * * * *